(12) United States Patent
Miyauchi

(10) Patent No.: US 11,288,054 B2
(45) Date of Patent: Mar. 29, 2022

(54) VEHICULAR COMMUNICATION SYSTEM

(71) Applicant: Toyota Jidosha Kabushiki Kaisha, Toyota (JP)

(72) Inventor: Yusuke Miyauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/267,554

(22) Filed: Feb. 5, 2019

(65) Prior Publication Data
US 2019/0243633 A1 Aug. 8, 2019

(30) Foreign Application Priority Data

Feb. 6, 2018 (JP) .............................. JP2018-019413

(51) Int. Cl.
*G06F 8/65* (2018.01)
*H04L 12/40* (2006.01)
(Continued)

(52) U.S. Cl.
CPC .............. *G06F 8/65* (2013.01); *B60R 16/023* (2013.01); *H04L 12/40* (2013.01);
(Continued)

(58) Field of Classification Search
CPC .............. G06F 8/60–71; B60R 16/023; B60R 2021/01286; H04L 12/40; H04L 2012/40273; H04L 67/12; H04L 67/34
(Continued)

(56) References Cited

U.S. PATENT DOCUMENTS 6,357,014 B1 * 3/2002 Correia ................... H04L 29/06
  713/502
9,646,156 B2 * 5/2017 Yan ....................... G06F 21/554
(Continued)

FOREIGN PATENT DOCUMENTS

CN     107251491 A    10/2017
JP     2008-276306 A  11/2008
(Continued)

OTHER PUBLICATIONS

Shi, G., et al., A Vehicle Electric Control Unit Over-the-Air Reprogramming System, 2015 International Conference on Connected Vehicles and Expo (ICCVE), 2015, 4 pages, [retrieved on Nov. 23, 2021], Retrieved from the Internet: <URL:http://ieeexplore.ieee.org/>.*

(Continued)

*Primary Examiner* — Geoffrey R St Leger
(74) *Attorney, Agent, or Firm* — Dinsmore & Shohl LLP

(57) ABSTRACT

An object of the present disclosure is to determine whether or not communication between ECUs after update of a software program is expected communication. A vehicular communication system includes: a storage unit which stores a first piece of information indicating data scheduled to be transmitted and received on a bus connecting a plurality of ECUs so that the ECUs can communicate with one another; an acquiring unit which acquires a second piece of information indicating data being transmitted and received on the bus when a software program of at least one of the plurality of ECUs is updated; and a determining unit which determines whether or not expected communication is being executed on the bus based on the first piece of information and the second piece of information.

8 Claims, 6 Drawing Sheets

(51) Int. Cl.
*B60R 16/023* (2006.01)
*H04L 29/08* (2006.01)
*B60R 21/01* (2006.01)
*H04L 67/00* (2022.01)

(52) U.S. Cl.
CPC .......... *H04L 12/4015* (2013.01); *H04L 67/34* (2013.01); *B60R 2021/01286* (2013.01); *H04L 2012/40273* (2013.01)

(58) Field of Classification Search
USPC .................................................. 717/168–178
See application file for complete search history.

(56) References Cited

U.S. PATENT DOCUMENTS

| | | | | |
|---|---|---|---|---|
| 10,241,807 | B2* | 3/2019 | Nakahara | G05D 1/0088 |
| 10,685,124 | B2 | 6/2020 | Amano et al. | |
| 10,708,293 | B2* | 7/2020 | Galula | H04L 67/12 |
| 2013/0191576 | A1* | 7/2013 | Chiang | G06F 8/654 |
| | | | | 710/305 |
| 2015/0063371 | A1* | 3/2015 | Horvath | H04L 47/805 |
| | | | | 370/461 |
| 2016/0019389 | A1* | 1/2016 | Yan | G06F 21/554 |
| | | | | 726/23 |
| 2016/0378457 | A1 | 12/2016 | Adachi et al. | |
| 2016/0381059 | A1* | 12/2016 | Galula | B60R 25/30 |
| | | | | 726/23 |
| 2017/0126703 | A1 | 5/2017 | Ujiie et al. | |
| 2017/0228236 | A1* | 8/2017 | Nakahara | G05D 1/0088 |
| 2018/0218158 | A1* | 8/2018 | Amano | G06F 21/55 |
| 2019/0305962 | A1* | 10/2019 | Takemori | G06F 21/57 |

FOREIGN PATENT DOCUMENTS

| | | |
|---|---|---|
| JP | 2015-103163 A | 6/2015 |
| WO | 2016/038816 A1 | 3/2017 |

OTHER PUBLICATIONS

Onuma, Y., et al., ECU Software Updating in Future Vehicle Networks, 2017 31st International Conference on Advanced Information Networking and Applications Workshops, 2017, 6 pages, [retrieved on Nov. 23, 2021], Retrieved from the Internet: <URL:http://ieeexplore.ieee.org/>.*

Onuma, Y., et al., Improved Software Updating for Automotive ECUs, 2016 IEEE 40th Annual Computer Software and Applications Conference, 2016, 6 pages, [retrieved on Nov. 23, 2021], Retrieved from the Internet: <URL:http://ieeexplore.ieee.org/>.*

* cited by examiner

FIG. 3

| MESSAGE TYPE | ID | EXPECTED VALUE | | DATA CONFIRMATION |
|---|---|---|---|---|
| | | PERIODICITY [msec] | FREQUENCY [TIMES] | |
| CONTROL MESSAGE (REGULAR) | xxx | 10 | 80 | ABSENT |
| | yyy | 800 | 1 | ABSENT |
| CONTROL MESSAGE (IRREGULAR) | ppp | — | 1 | PRESENT |
| | qqq | — | 2 | ABSENT |
| NETWORK MANAGEMENT MESSAGE | — | 720 | — | PRESENT |
| | — | 720 | — | PRESENT |
| UNNECESSARY MESSAGE | AAA | — | — | — |
| | BBB | — | — | — |

FIG. 4

| MESSAGE TYPE | ID | EXPECTED VALUE | | DATA CONFIRMATION | FLAG | | | | |
|---|---|---|---|---|---|---|---|---|---|
| | | PERIODICITY [msec] | FREQUENCY [TIMES] | | PERIODICITY FAIL NG | FREQUENCY FAIL NG | DATA DEFECTIVE | UNNECESSARY MESSAGE RECEIVED | |
| CONTROL MESSAGE (REGULAR) | xxx | 10 | 80 | ABSENT | 0 | 0 | 1 | 0 | |
| | yyy | 800 | 1 | ABSENT | 0 | 0 | 2 | 0 | |
| CONTROL MESSAGE (IRREGULAR) | — | — | 1 | PRESENT | — | 1 | 2 | 0 | |
| | — | — | 2 | ABSENT | — | 2 | 1 | 0 | |
| NETWORK MANAGEMENT MESSAGE | — | 720 | — | PRESENT | 2 | — | 2 | 2 | |
| | — | 720 | — | PRESENT | 2 | — | 2 | 2 | |

VEHICULAR COMMUNICATION SYSTEM

CROSS-REFERENCE TO RELATED APPLICATION

This application claims priority to Japanese Patent Application No. 2018-019413, filed Feb. 6, 2018, incorporated herein by reference in its entirety.

BACKGROUND

Field

The present disclosure relates to a vehicular communication system.

Description of Related Art

Present-day automobiles are mounted with a plurality of microcomputers referred to as electronic control units (ECUs) which communicate with one another. In addition, since opportunities for updating software programs used by the ECUs have increased with the dissemination of driving assistance technology and autonomous driving technology, techniques for verifying that software programs are updated correctly have become important.

For example, Patent Publication JP-A-2015-103163 discloses a program update system which executes a computer program that realizes means for determining whether or not operations of a control apparatus after update of a control program are normal and which returns a result of the determination to a relay apparatus.

SUMMARY

However, when an update of a software program is executed per ECU, ECUs updated with a latest software program and ECUs not updated with the latest software program may be created and communication which differs from expected communication may be executed among the ECUs. In addition, since recent increases in software programs for update being distributed via a wireless network have created more cases where update timings of software programs differ from one ECU to the next, a resolution for this problem is much anticipated.

In consideration thereof, an object of embodiments of the present disclosure is to provide a vehicular communication system capable of determining whether or not communication between ECUs after update of a software program is expected communication.

A vehicular communication system according to an aspect of the present disclosure includes: a storage unit which stores a first piece of information indicating data scheduled to be transmitted and received on a bus connecting a plurality of electronic control units (ECUs) so that the ECUs can communicate with one another; an acquiring unit which acquires a second piece of information indicating data being transmitted and received on the bus when a software program of at least one of the plurality of ECUs is updated; and a determining unit which determines whether or not expected communication is being executed on the bus based on the first piece of information and the second piece of information.

According to the present disclosure, a vehicular communication system capable of determining whether or not communication between ECUs after update of a software program is expected communication can be provided.

BRIEF DESCRIPTION OF DRAWINGS

FIG. 3 is a diagram showing an example of a type, an ID, an expected value, and presence/absence of data confirmation of messages stored by a communication confirmation ECU according to the embodiment;

FIG. 4 is a diagram showing an example of relationships between a type, an ID, an expected value, and presence/absence of data confirmation of messages stored by a communication confirmation ECU according to the embodiment and flags corresponding thereto;

DETAILED DESCRIPTION

Figure 1:
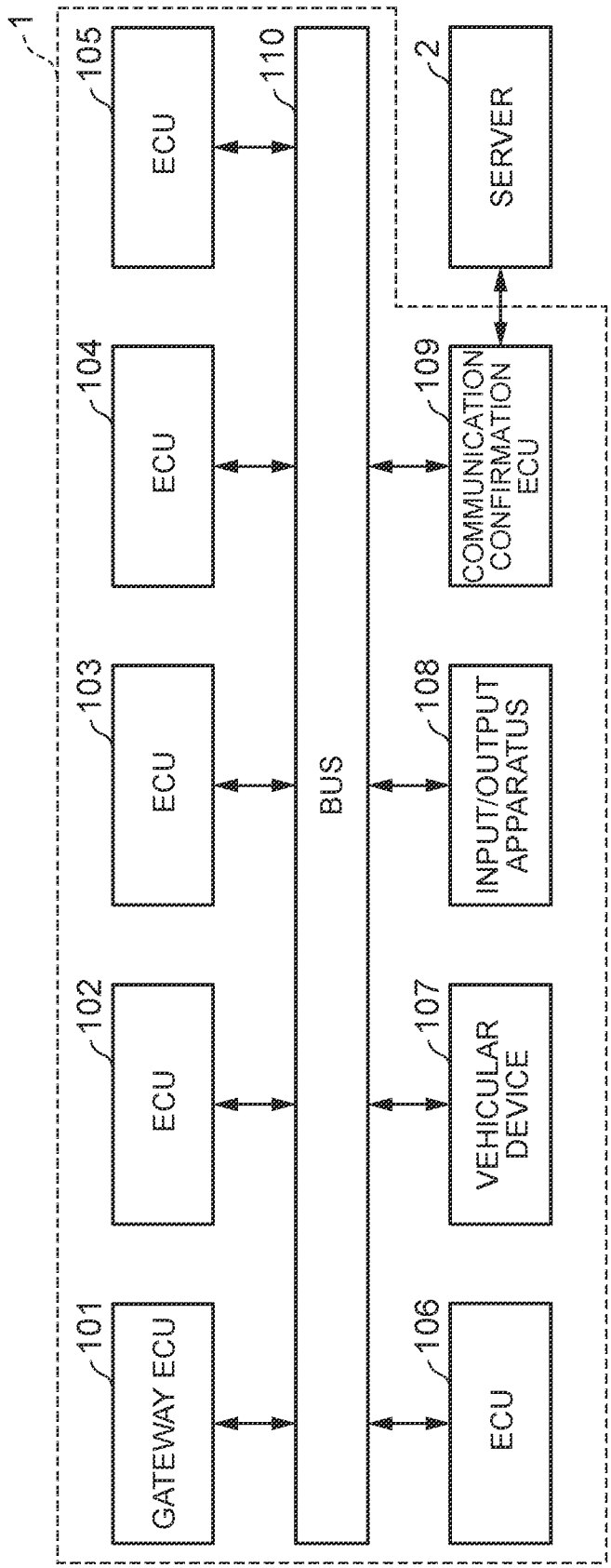
FIG. 1 is a diagram showing an example of a vehicular communication system according to an embodiment.

Embodiments will be described with reference to the drawings. It should be noted that, in the diagrams, elements with a same reference numeral have a same or similar configuration.

A vehicular communication system according to the embodiment will be described with reference to FIGS. 1 to 4. For example, as shown in FIG. 1, a vehicular communication system 1 includes a gateway ECU 101, an ECU 102, an ECU 103, an ECU 104, an ECU 105, an ECU 106, a vehicular device 107, an input/output apparatus 108, a communication confirmation ECU 109, and a bus 110. Hereinafter, a case where a software program of the ECU 102 is updated will be described as an example. An update of the software program may be executed both when an automobile is stationary and when the automobile is traveling.

The gateway ECU 101 relays data transmitted and received between the ECU 102, the ECU 103, the ECU 104, the ECU 105, or the ECU 106 and an ECU connected to a bus that differs from the bus 110. The five ECUs control respective parts of the automobile such as a brake and a sensor. The vehicular device 107 is an interface device such as a car navigation device or a meter. The input/output apparatus 108 includes an input apparatus such as a button and an output apparatus such as a display.

Figure 2:
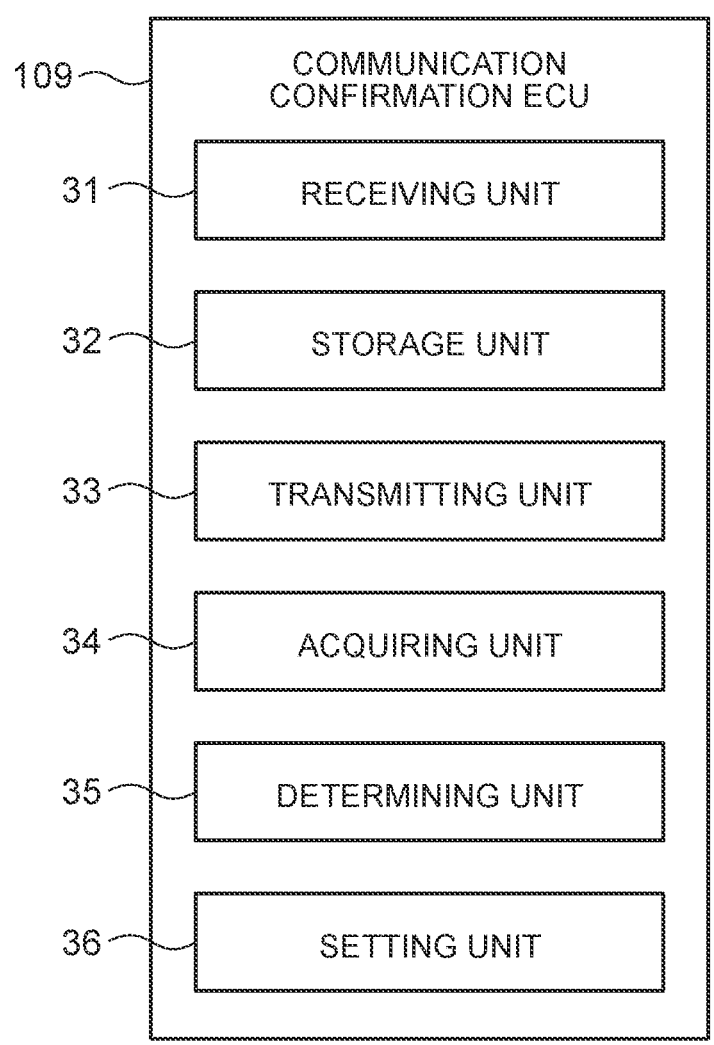
FIG. 2 is a diagram showing an example of a communication confirmation ECU according to the embodiment.

For example, as shown in FIG. 2, the communication confirmation ECU 109 includes a receiving unit 31, a storage unit 32, a transmitting unit 33, an acquiring unit 34, a determining unit 35, and a setting unit 36. In some embodiments, the communication confirmation ECU 109 includes at least the storage unit 32, the acquiring unit 34, and the determining unit 35, and another apparatus equipped with comparable functions with respect to at least one of the receiving unit 31, the storage unit 32, the transmitting unit 33, the acquiring unit 34, the determining unit 35, and the setting unit 36 may be used. Furthermore, the communication confirmation ECU 109 is connected to a server 2 shown in FIG. 1 by a wireless network so as to be capable of mutual communication. Moreover, the communication confirmation ECU 109 may be equipped with similar functions to the gateway ECU 101. In this case, the vehicular communication system 1 does not need to include the gateway ECU 101.

The receiving unit 31 receives information indicating that a software program has been updated from the ECU 102.

The storage unit 32 is a storage medium storing a first piece of information indicating data scheduled to be transmitted and received on the bus 110 and is, for example, a random access memory (RAM) or a static random access memory (SRAM). In this case, the first piece of information is, for example, an expected value of a message scheduled to be transmitted and received on the bus 110, unnecessary data that does not require to be transmitted and received on the bus 110, or particularly important data transmitted and received on the bus 110.

For example, as shown in FIG. 3, the storage unit 32 stores, in association with each other, a type, an ID (Identification), an expected value, and a presence/absence of data confirmation of a message scheduled to be transmitted and received on the bus 110.

For example, there are four types of messages including a regularly transmitted control message, an irregularly transmitted control message, a network management message, and an unnecessary message. The two control messages are messages for controlling the respective parts of the automobile controlled by the five ECUs shown in FIG. 1. The network management message is a message for causing the bus 110 to make a transition to a wakeup state or a sleep state. The unnecessary message is a message which does not need to be transmitted or received on the bus 110 and which is received when, for example, the vehicular communication system 1 is subjected to a cyber attack or the ECUs shown in FIG. 1 are erroneously updated by another software program.

The expected value of a regularly transmitted control message is more readily generated than the expected value of an irregularly transmitted control message. This is because it may not necessarily be easy to determine whether a case where the irregularly transmitted control message is transmitted is normal or not.

The ID is a character string for identifying a message and is attached to, for example, the front of the message. The expected value is a physical quantity indicating characteristics of a message such as a periodicity or a transmission frequency of the message. Data confirmation refers to a process of comparing data stored by the storage unit 32 with data acquired by the acquiring unit 34 as a second piece of information (to be described later) to determine whether or not expected communication is being executed on the bus 110.

For example, as shown in FIG. 3, the control message (regular) with the ID "xxx" has an expected value of which the periodicity is 10 msec and the frequency is 80, and data confirmation is not performed. In a similar manner, the control message (irregular) with the ID "ppp" has an expected value of which the frequency is 1, and data confirmation is performed. In addition, the control message (irregular) with the ID "qqq" has an expected value of which the frequency is 2, and data confirmation is not performed. The other messages shown in FIG. 3 may be described in a similar manner. Since an unnecessary message is a message which does not need to be transmitted or received on the bus 110, an expected value thereof is not stored in the storage unit 32 and presence/absence of data confirmation is not particularly defined.

In addition, favorably, the first piece of information transmitted and received on the bus 110 is stored by the storage unit 32 within a prescribed time after an accessory power supply or an ignition power supply is turned on. This is because the first piece of information within the prescribed time is often decided in advance and often enables a determination on whether or not expected communication is being executed on the bus 110 to be made more readily. Furthermore, in order to generate accurate expected values of all pieces of data transmitted and received on the bus 110, favorably, a length of the prescribed time is sufficient for generating an expected value of data with a longest transmission period among the pieces of data. Alternatively, the storage unit 32 may store, one by one, unnecessary messages transmitted and received on the bus 110.

The transmitting unit 33 transmits information indicating that storage of the first piece of information has been completed to the server 2. In addition, the transmitting unit 33 transmits, to the input/output apparatus 108, at least one of information indicating that a software program of the ECU 102 or the like has been updated and information indicating that a process of determining whether or not expected communication is being executed on the bus 110 is to be started. Furthermore, the transmitting unit 33 transmits information indicating that there is no problem with the communication or warning information indicating that there is a problem with the communication to the vehicular device 107.

When a software program of at least one of the five ECUs shown in FIG. 1 is updated, the acquiring unit 34 acquires the second piece of information indicating data being transmitted and received on the bus 110. In this case, the second piece of information is, for example, an expected value of a message being transmitted and received on the bus 110, unnecessary data that does not require to be transmitted and received on the bus 110, or particularly important data transmitted and received on the bus 110. For example, the acquiring unit 34 acquires the second piece of information spread as an electric signal on the bus 110 directly from the bus 110.

In addition, favorably, the acquiring unit 34 acquires the second piece of information being transmitted and received on the bus 110 within the prescribed time described earlier. This is because the second piece of information within the prescribed time is often decided in advance and often enables a determination on whether or not expected communication is being executed on the bus 110 to be made more readily. Alternatively, the acquiring unit 34 may acquire, one by one, unnecessary messages transmitted and received on the bus 110.

Based on the first piece of information and the second piece of information, the determining unit 35 determines whether or not expected communication network is being executed on the bus 110. Specifically, when the first piece of information and the second piece of information are expected values of a message, the determining unit 35 compares the first piece of information with the second piece of information, and when the two pieces of information differ from each other, the determining unit 35 determines that expected communication is not being executed on the bus 110. Alternatively, when the first piece of information and the second piece of information are unnecessary data, the determining unit 35 compares the first piece of information with the second piece of information, and when the two pieces of information are equal to each other, the determining unit 35 determines that expected communication is not being executed on the bus 110.

In addition, the determining unit 35 determines whether or not diagnosis registration is necessary and determines whether or not transmission of warning information is necessary. In this case, diagnosis registration refers to a process of registering, when unexpected communication is being executed on the bus 110 but there is no need to transmit warning information, the fact that the communication is executed.

Moreover, the determining unit 35 is capable of executing the three determinations described above both when the automobile is stationary and when the automobile is traveling.

The setting unit 36 sets a flag "0", a flag "1", or a flag "2" in accordance with results of the respective determinations made by the determining unit 35 and performs diagnosis registration.

For example, as shown in FIG. 4, when the determining unit 35 determines that "periodicity failed", "frequency failed", or "unnecessary message received" with respect to the control message (regular) with the ID "xxx" shown in FIGS. 3 and 4, the setting unit 36 sets the flag "0", but when the determining unit 35 determines that "data defective", the setting unit 36 sets the flag "1". In this case, "data defective" means that, as a result of the data confirmation shown in FIGS. 3 and 4, a determination is made that expected communication is not being executed on the bus 110. In a similar manner, when the determining unit 35 determines that "periodicity failed", "data defective", and "unnecessary message received" with respect to the network management message shown in FIGS. 3 and 4, the setting unit 36 sets the flag "2". The other messages shown in FIG. 4 may be described in a similar manner.

Figure 5:
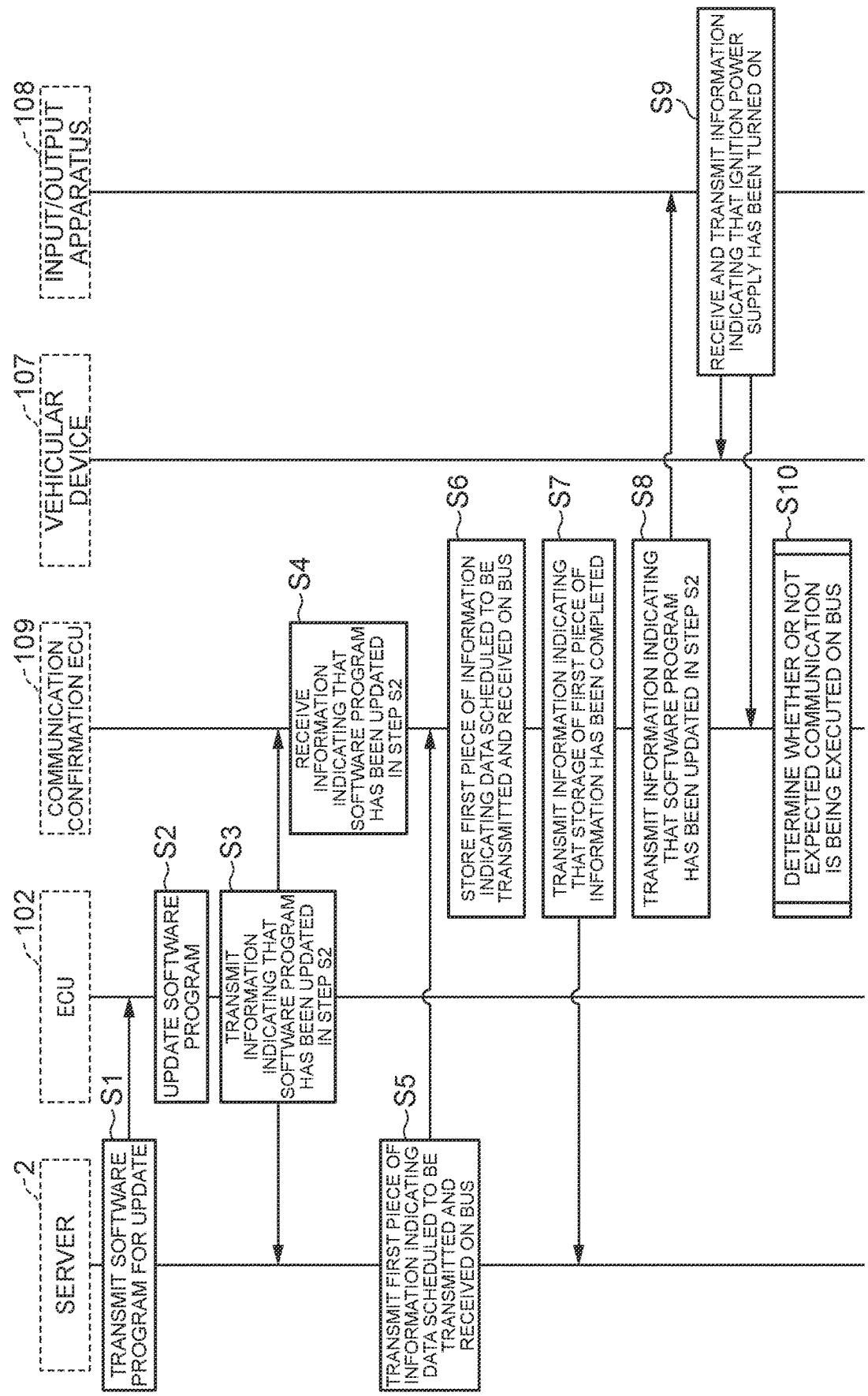
FIG. 5 is a sequence diagram showing an example of a process according to the embodiment.

Next, an example of a process according to the embodiment will be described with reference to FIG. 5.

In step S1, the server 2 transmits a software program for update to the ECU 102.

In step S2, the ECU 102 updates the software program.

In step S3, the ECU 102 transmits information indicating that the software program has been updated in step S2 to the server 2.

In step S4, the receiving unit 31 receives the information indicating that the software program has been updated in step S2 from the ECU 102.

In step S5, the server 2 transmits a first piece of information indicating data scheduled to be transmitted and received on the bus 110 to the communication confirmation ECU 109.

In step S6, the storage unit 32 stores the first piece of information indicating data scheduled to be transmitted and received on the bus 110.

In step S7, the transmitting unit 33 transmits information indicating that storage of the first piece of information has been completed.

In step S8, the transmitting unit 33 transmits information indicating that the software program has been updated in step S2 to the input/output apparatus 108.

In step S9, the input/output apparatus 108 receives information indicating that the ignition power supply has been turned on and transmits the information to the communication confirmation ECU 109 and the vehicular device 107.

In step S10, the communication confirmation ECU 109 determines whether or not expected communication is being executed on the bus 110. Details of step S10 will be described with reference to FIG. 6.

Alternatively, in step S9, the input/output apparatus 108 may receive information indicating that the accessory power supply instead of the ignition power supply has been turned on and may transmit the information to the communication confirmation ECU 109 and the vehicular device 107.

Figure 6:
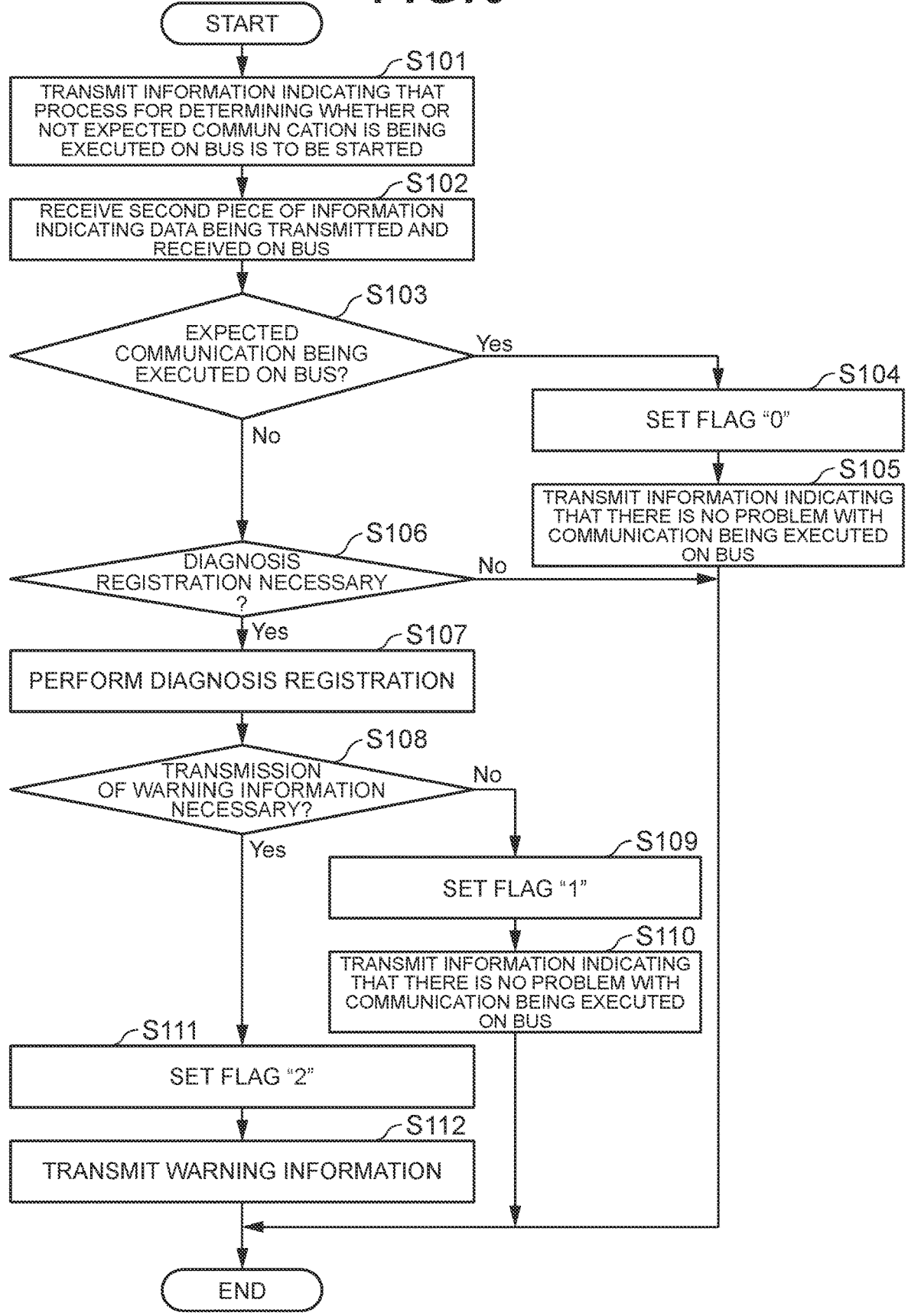
FIG. 6 is a flow chart showing an example of a process by which a communication confirmation ECU according to the embodiment determines whether or not expected communication is being executed on a bus.

Next, an example of details of step S10 will be described with reference to FIG. 6.

In step S101, the transmitting unit 33 transmits, to the input/output apparatus 108, information indicating that a process of determining whether or not expected communication is being performed on the bus 110 is to be started, and advances the process to step S102.

In step S102, the acquiring unit 34 acquires the second piece of information indicating data being transmitted and received on the bus 110, and advances the process to step S103.

In step S103, the determining unit 35 determines whether or not expected communication is being executed on the bus 110. When the determining unit 35 determines that the communication is being executed (step S103: Yes), the determining unit 35 advances the process to step S104, but when the determining unit 35 determines that the communication is not being executed (step S103: No), the determining unit 35 advances the process to step S106.

In step S104, the setting unit 36 sets the flag "0" and advances the process to step S105.

In step S105, the transmitting unit 33 transmits, to the input/output apparatus 108, information indicating that there is no problem with the communication being performed on the bus 110, and ends the process.

In step S106, the determining unit 35 determines whether or not diagnosis registration is necessary. When the determining unit 35 determines that diagnosis registration is necessary (step S106: Yes), the determining unit 35 advances the process to step S107, but when the determining unit 35 determines that diagnosis registration is unnecessary (step S106: No), the determining unit 35 ends the process.

In step S107, the setting unit 36 performs diagnosis registration and advances the process to step S108.

In step S108, the determining unit 35 determines whether or not transmission of warning information is necessary. When the determining unit 35 determines that transmission of warning information is necessary (step S108: Yes), the determining unit 35 advances the process to step S111, but when the determining unit 35 determines that transmission of warning information is unnecessary (step S108: No), the determining unit 35 advances the process to step S109.

In step S109, the setting unit 36 sets the flag "1" and advances the process to step S110.

In step S110, the transmitting unit 33 transmits, to the input/output apparatus 108, information indicating that there is no problem with the communication being performed on the bus 110, and ends the process.

In step S111, the setting unit 36 sets the flag "2" and advances the process to step S112.

In step S112, the transmitting unit 33 transmits warning information to the input/output apparatus 108 and ends the process.

Alternatively, when the vehicular communication system 1 determines in step S108 that transmission of warning information is unnecessary, the vehicular communication system 1 may end the process without executing steps S109 and S110.

In addition, when the vehicular communication system 1 determines in step S106 that diagnosis registration is unnecessary, the vehicular communication system 1 may execute steps S109 and S110. In this case, for example, the vehicular communication system 1 may end the process after executing step S105.

An embodiment has been described above. A vehicular communication system 1 according to the embodiment includes: a storage unit 32 which stores a first piece of information indicating data scheduled to be transmitted and received on a bus connecting a plurality of ECUs so that the ECUs can communicate with one another; an acquiring unit 34 which acquires a second piece of information indicating data being transmitted and received on the bus when a software program of at least one of the plurality of ECUs is updated; and a determining unit 35 which determines whether or not expected communication is being executed on the bus based on the first piece of information and the second piece of information. Therefore, the vehicular communication system 1 is capable of determining whether or not communication between ECUs after a software program is updated is expected communication and transmitting a result of the determination to a user.

The present disclosure is not limited to the embodiment described above and can be implemented in various other modes without departing from the gist of the present disclosure. Therefore, the embodiment described above is to be considered in all respects as illustrative and not restrictive. For example, an order in which the respective processing steps described above are executed can be arbitrarily changed or the respective processing steps may be executed in parallel as long as no contradictions arise in the contents of processing.

What is claimed is:

1. A vehicular communication system, comprising:
    a storage unit which stores a first piece of information indicating data scheduled to be transmitted and received on a bus connecting a plurality of electronic control units (ECUs) so that the ECUs can communicate with one another, wherein the first piece of information comprises an expected value of a message scheduled to be transmitted and received on the bus and a periodicity or frequency of transmission of the message;
    a receiving unit which receives from at least one of the plurality of ECUs information indicating that a software program of the at least one of the plurality of ECUs is updated;
    an acquiring unit which acquires a second piece of information indicating data being transmitted and received on the bus when the receiving unit has received from the at least one of the plurality of ECUs the information indicating that the software program of the at least one of the plurality of ECUs is updated;
    a determining unit which determines whether or not expected communication is being executed on the bus based on the first piece of information and the second piece of information when the receiving unit has received from the at least one of the plurality of ECUs the information indicating that the software program of the at least one of the plurality of ECUs is updated, and determines whether or not to perform diagnosis registration upon determination that expected communication is not executed on the bus; and
    a performing unit which performs diagnosis registration and transmits warning information to a display when the determining unit has determined to perform diagnosis registration;
    wherein the receiving unit receives the first piece of information from a server.

2. The vehicular communication system according to claim 1, wherein
    the storage unit stores, within a prescribed time after an accessory power supply or an ignition power supply is turned on, the first piece of information indicating data scheduled to be transmitted and received on the bus, and
    the acquiring unit acquires the second piece of information being transmitted and received on the bus within the prescribed time.

3. The vehicular communication system according to claim 1, wherein
    the acquiring unit acquires, as the second piece of information, an expected value of a message being transmitted and received on the bus and a periodicity or frequency of transmission of the message, and
    the determining unit compares the first piece of information with the second piece of information and, when the pieces of information differ from each other, determines that expected communication is not being executed on the bus.

4. The vehicular communication system according to claim 1, wherein
    the storage unit stores, as the first piece of information, unnecessary data that does not need to be transmitted and received on the bus,
    the acquiring unit acquires the unnecessary data as the second piece of information, and
    the determining unit compares the first piece of information with the second piece of information and, when the pieces of information are equal to each other, determines that expected communication is not being executed on the bus.

5. A vehicular communication system, comprising:
    a receiving unit which receives from a server a first piece of information indicating data scheduled to be transmitted and received on a bus connecting a plurality of electronic control units (ECUs) so that the ECUs can communicate with one another, wherein the first piece of information comprises an expected value of a message scheduled to be transmitted and received on the bus and a periodicity or frequency of transmission of the message;
    a storage unit which stores the first piece of information;
    an acquiring unit which acquires a second piece of information indicating data being transmitted and received on the bus when a software program of at least one of the plurality of ECUs is updated;
    a determining unit which determines whether or not expected communication is being executed on the bus based on the first piece of information and the second piece of information,
    and determines whether or not to perform diagnosis registration when the first determining unit has determined that expected communication is not executed on the bus; and
    a performing unit which performs diagnosis registration and transmits warning information to a display when the determining unit has determined to perform diagnosis registration.

6. The vehicular communication system according to claim 5, wherein
    the storage unit stores, within a prescribed time after an accessory power supply or an ignition power supply is turned on, the first piece of information indicating data scheduled to be transmitted and received on the bus, and
    the acquiring unit acquires the second piece of information being transmitted and received on the bus within the prescribed time.

7. The vehicular communication system according to claim 5, wherein
the acquiring unit acquires, as the second piece of information, an expected value of a message being transmitted and received on the bus and a periodicity or frequency of transmission of the message, and
the determining unit compares the first piece of information with the second piece of information and, when the pieces of information differ from each other, determines that expected communication is not being executed on the bus.

8. The vehicular communication system according to claim 5, wherein
the storage unit stores, as the first piece of information, unnecessary data that does not need to be transmitted and received on the bus,
the acquiring unit acquires the unnecessary data as the second piece of information, and
the determining unit compares the first piece of information with the second piece of information and, when the pieces of information are equal to each other, determines that expected communication is not being executed on the bus.

\* \* \* \* \*